United States Patent Office 3,186,930
Patented June 1, 1965

3,186,930
METHOD FOR THE PRODUCTION OF OZONE
Gerhard A. Cook, Clarence, N.Y., assignor to Union Carbide Corporation, a corporation of New York
No Drawing. Filed Sept. 19, 1961, Ser. No. 140,639
9 Claims. (Cl. 204—176)

The present invention relates to an improved method for the production of ozone wherein a fluorine-containing compound is employed to maintain the efficiency of ozone production in certain types of ozone generators.

During the past few years the use of ozone has increased substantially. Ozone is used as an oxidizing agent in experimental rocket-propulsion systems, in the industrial synthesis of organic compounds, and as a reagent in the chemical analysis of unsaturated organic compounds. The commercial production of ozone in continuous processes has, however, in some cases been hampered by low efficiencies of ozone production. It has been found that certain types of ozonizers will give relatively high initial yields of ozone, but that gradually, under continued use, the ozonizer "ages" and the efficiency of ozone synthesis is appreciably decreased.

Various attempts have been made to sustain and/or increase the yield of ozonizers. A number of gases have been added to the reactant oxygen, prior to ozonizing, in an attempt to increase the efficiency of ozone production. For example, carbon monoxide and nitrogen have been proposed for this purpose, but these gases, to be effective, must be added in relatively high concentration. For example, up to 12 percent nitrogen may be added.

It is an object of the present invention to provide an improved process for the production of ozone in silent electric discharge ozonizers wherein minute amounts of particular fluorine-containing compounds are utilized with the gaseous oxygen starting reactant to maintain and/or increase the efficiency of ozone production.

The improved method for the production of ozone in silent electric discharge ozonizers comprises introducing oxygen gas, preferably containing less than about 5% nitrogen, into an ozonizer and passing the gas through the silent electric discharge of the ozonizer; maintaining the dew point (with respect to moisture) of the oxygen-containing reactant gas at less than about $-40°$ C. during passage through the electric discharge; and introducing into the oxygen-containing gas, prior to passage through the electric discharge, at least one compound selected from the group consisting of sulfur hexafluoride, fluorinated aliphatic acids and fluorinated aliphatic anhydrides in an amount between about 1 part per million and 100 parts per million. To be effective, the acids or anhydrides must have a vapor pressure of at least 0.001 mm. of mercury at ambient temperature. Recovery of ozone may readily be accomplished by any one of a variety of known methods including that method disclosed in U.S. Patent No. 2,872,397 issued February 3, 1959, to A.D. Kiffer.

As is known by skilled artisans, ozone is usually synthesized in ozonizers employing a silent electric discharge produced by applying a high-voltage, alternating polarity electric potential across a pair of electrodes positioned substantially parallel to each other and separated by a space. A part of the space is filled with a dielectric material which prevents arcing or sparking between the electrodes. The silent electric discharge occurs across the space between the plates. The oxygen-containing starting reactant is passed through the electric discharge to effect conversion of $O_2$ to $O_3$. By way of illustration, the electrodes may be flat plates, the planes of the plates being substantially parallel and separated by a plate of dielectric material and by space. The space provides a passageway through which the starting oxygen-containing reactant is passed and wherein the reactant is exposed to the silent electric discharge causing conversion of $O_2$ to ozone. The parallel electrodes may also comprise two concentric tubes with a tube of dielectric material and a space between them. The annular space permits passage of gaseous reactant through the ozonizer proper.

In the preferred arrangement for the present process, the gaseous reactant is passed through a silent electric discharge maintained between two glass surfaces. The side of the glass surface away from the silent discharge gap is covered by an electrically conducting material.

The preferred glass surface is a boro-silicate glass surface although any type of glass which loses its ozone-producing effectiveness with time may be used.

The potential maintained across the ozonizer generally ranges from about 5,000 to about 50,000 volts. The preferred range is about 5,000 to about 20,000 volts. The preferred frequency range extends from 50 cycles to 10,000 cycles per second.

The gaseous oxygen-containing starting reactant is preferably substantially free of nitrogen although gaseous mixtures containing nitrogen up to about 5 volume percent may be utilized.

The dew point of the gaseous reactant mixture during passage through the discharge zone should be maintained below about $-40°$ C. to aid in maintaining a high ozone-producing efficiency in the apparatus. The preferred dew point is below about $-60°$ C. Further drying of the gas apparently does not increase the yield of ozone appreciably.

Fluorine-containing compounds are utilized in the present process to maintain, and indeed in many instances to increase, the efficiency of ozone production. Fluorine-containing compounds useful in the present process include sulfur hexafluoride, fluorinated aliphatic acids such as trifluoroacetic acid, heptafluoro-butyric acid, pentafluoropropionic acid and fluorinated anhydrides such as hexafluoroacetic anhydride. It is essential that the fluorine-containing compounds have a vapor pressure of at least 0.001 mm. of mercury at ambient temperature.

Sulfur hexafluoride and/or trifluoroacetic acid are the preferred compounds.

The fluorinated compounds are utilized in the present process only in minute amounts. They generally are employed in amounts less than about 100 parts per million, with less than about 10 parts per million being the preferred concentration. Amounts as low as one part per million will in some cases result in readily noticeable improvement in the efficiency of ozone production.

The reaction mechanics of the present process have not been established. The term "catalyst" is not, in the strict sense of the word, a proper term for the fluorine-containing compounds utilized in the present process since there is ample evidence that the compounds are consumed in the reaction zone, apparently by reacting with and "cleaning" or activating the discharge surfaces. The term "activator" is utilized herein to denote the fluorine-containing compounds amenable for use in the present process.

No "free" (elementary) fluorine is produced from the activators used in the present process. It does seem possible that a little hydrofluoric acid is produced in the presence of the trace of moisture that still remains in the oxygen stream and adsorbed on the glass, even though the dew point of the oxygen is very low, and it may be that this trace of hydrofluoric acid helps to activate the ozonizer surfaces. The actual addition of free hydrofluoric acid to the oxygen stream is not, however, recommended because of its corrosive nature.

It has been found that the peak ozone-producing efficiency in an "all-glass" or "aluminum-glass" type ozonizer being operated for the first time with pure oxygen as feed gas is achieved within the first few hours of operation. (In all-glass generators, the oxygen-containing gas comes in contact only with glass. In aluminum-glass ozonizers, the oxygen stream in the ozone generator comes in contact with glass and aluminum surfaces.) After the ozonizer has been operated over a period of one to three hours, the efficiency falls off until a steady state is reached at which time the efficiency is considerably lower than that experienced during the early stages of operation. Apparently an undesirable change takes place on either the glass and/or the aluminum surface which causes a reduction in the ozone yield. If the ozonizer is dismantled and the surfaces are treated with dilute hydrofluoric acid, washed with water, and dried, and the ozonizer reassembled, the yield of ozone will be temporarily improved. It appears, therefore, that during the operation of all-glass or aluminum-glass ozonizers, changes can take place on the surfaces to which the oxygen-containing gas is exposed, which result in a decrease in the yield of ozone. The exact nature of these changes is not known.

According to the present invention, the efficiency of ozone production from oxygen in an all-glass or aluminum-glass ozonizer may be maintained at or near its peak efficiency by the intermittent or continuous addition of less than 100 parts per million of certain fluorine-containing compounds to the oxygen-containing input gas; or, if the efficiency has fallen from its peak efficiency during operation, the higher efficiency may be at least partially restored by the addition of such compounds. The exact mechanism by which this revitalization operates is not known. The fluorine-containing compounds in the presence of the electric discharge apparently reactivate the surface area in a manner similar to the action of hydrofluoric acid mentioned above.

The gaseous activators may be added either continuously or discontinuously. In either case, only minute quantities are required, and the resulting concentration of impurities in the gas leaving the ozonizer is either nil or very low. For the purposes of this invention, it would be of no avail to add the activator to the stream of oxygen- and ozone-containing gas after it has left the ozone generator.

To more fully illustrate the advantages realized by employing the herein-disclosed improvements in silent electric discharge processes for the production of ozone, the present invention will be discussed in more detail in the following examples.

EXAMPLE I

Data for a series of runs showing the effect of adding a trace of trifluoracetic acid ($CF_3COOH$) to a stream of oxygen just before entering a laboratory ozone generator are given in Table I. The temperature of the ozone generator was kept at 28° C. ±2° C. A small flow (0.66 cu. ft./hr.) of oxygen was passed in series through two "all-glass" concentric-tube laboratory ozone generators of the Berthelot type. The tubes of the generators were made of borosilicate glass about 2.5 mm. thick. The reaction zone was about 60 cm. in length, the outside diameter of the outer tube being about 2.5 cm. and the apparatus had a discharge gap about 1.5 mm. across. The total surface area of the two glass plates between which the silent electric discharge was maintained was about 475 sq. cm. in each of the two ozonizers. All conditions were kept constant throughout the run except that in some of the runs a trace of trifluoroacetic acid was added to the oxygen just before it entered the ozonizer reaction zone and in other runs no trifluoroacetic acid was added. A potential of approximately 15,000 volts at 60 cycles per second was maintained between the glass surfaces in the reaction zone.

The all-glass ozonizers were first used for a number of days without adding any catalyst to the oxygen stream. Their ozone-producing efficiency had fallen off to a relatively low level. The new runs then made are summarized in Table I. In all the runs the dew point of the reactant oxygen stream was maintained at about —78° C. As seen in the table, the power was turned on at 10 a.m. and the ozone concentration produced was 2.4 mole-percent. Within 20 minutes the ozone concentration became roughly constant at about 2.8 mole-percent. At this point $CF_3COOH$ was introduced into the reactant gas stream. The quantity of trifluoroacetic acid picked up by the oxygen stream was measured and found to vary between about 1 and 4 p.p.m. by volume (i.e., moles $CF_3COOH$ per million moles of oxygen). The ozone concentration immediately started to rise, and within a few minutes rose to a roughly constant value of 4.8 mole-percent. Addition of the $CF_3COOH$ was then discontinued. The yield of ozone did not fall off suddenly, but gradually fell to 3.7 mole-percent. The $CF_3COOH$ was then added again, and the ozone concentration gradually climbed to 6.3 mole-percent. By intermittently adding $CF_3COOH$ to the reactant gas prior to exposure to the silent electric discharge and by running the ozonizer long enough to reach a steady state in each case, it was shown that the beneficial effect of adding a trace of $CF_3COOH$ was reproducible.

At higher flows of oxygen through all-glass ozonizers of the same size, the relative increase in the ozone concentration was again found to be substantial. In one case the ozone concentration was found to rise, for example from 0.8 mole-percent without the activator to 1.22 mole-percent when the $CF_3COOH$ was added, an increase of about 52%.

*Table I*

EFFECT OF TRIFLUOROACETIC ACID ON ALL-GLASS OZONIZER PERFORMANCE

| Time | $CF_3COOH$ added | Mole-percent Ozone | Remarks |
|---|---|---|---|
| 10:00 | No | 2.4 | Ozonizer turned on. |
| 10:20–10:55 | No | 2.8 | Average ozone concentration without catalyst. |
| 10:55 | Yes | | Addition of $CF_3COOH$ begun. |
| 11:15 | Yes | 4.5 | Gradual rise in ozone concentration noted. |
| 11:55–1:15 | Yes | 5.8 | Average ozone concentration after catalyst became effective. |
| 1:15 | No | | Addition of $CF_3COOH$ stopped. |
| 1:45–2:20 | No | 3.7 | Average ozone concentration without catalyst. |
| 2:20 | Yes | | Addition of $CF_3COOH$ begun again. |
| 2:50–3:30 | Yes | 6.3 | New average ozone concentration with catalyst. |

EXAMPLE II

In an experiment carried out with the all-glass ozonizer similar to that used to obtain the data in Table I using sulfur hexafluoride as catalyst instead of trifluoroacetic acid, the ozone concentration was found to increase from 2.0 to 3.8 mole-percent after addition of the catalyst to the oxygen stream. The increase in ozone yield was thus about 90%. The quantity of $SF_6$ introduced into the oxygen stream was less than about 10 p.p.m. (i.e., less than 10 moles $SF_6$ per million moles of oxygen).

EXAMPLE III

Another ozonizer was built which was similar to that used in obtaining the data in Examples I and II except that the outer tube consisted of aluminum and the inner tube of borosilicate glass. Addition of $CF_3COOH$ to the reactant gas increased the ozone concentration from 0.8 to 1.6 mole-percent, an increase of 100%. As with the all-glass ozonizer, this effect could be repeated at will with the same general result.

While the best results were obtained by use of trifluoroacetic acid or sulfur hexafluoride as catalysts, beneficial results were also found when traces of the following were separately added to the oxygen stream before it entered the reaction zone: pentafluorobutyric acid, heptafluorobutyric acid, and the anhydride of trifluoroacetic acid. These are examples of fluorine-substituted aliphatic acids and anhydrides. Addition of large quantities (1% or more) of fluorine-containing compounds instead of a few parts per million was found in some cases actually to reduce the ozone yield. Under the preferred operating conditions, less than 10 parts per million of the compound is added. Addition of over 100 p.p.m. usually serves no useful purpose and may actually reduce the yield of ozone.

It is important to note that the beneficial effects of the fluorine-containing compound do not immediately cease but are only gradually reduced as the reactant oxygen-containing stream introduced into the ozonizer is changed from a stream containing fluorine compounds to a reactant stream free of fluorine compounds. This fact is further evidence that the fluorine-containing compounds aids in revitalizing the surfaces of the ozonizer. However, the possibility that the additives may also play a useful and important role in ozone production in the gas phase cannot be ruled out.

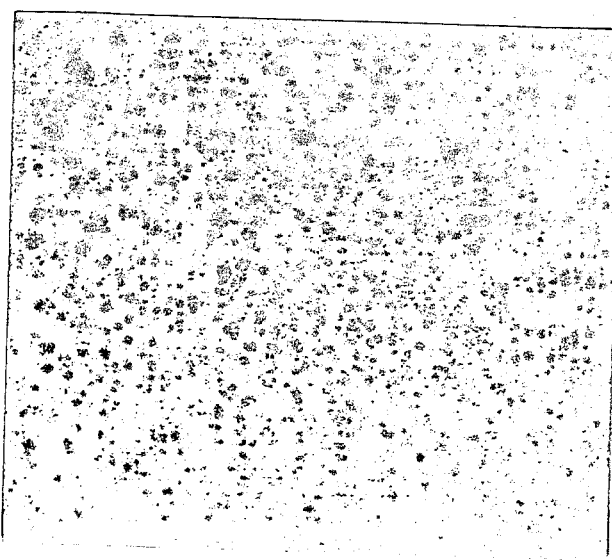

What is claimed is:

1. An improved method for the production of ozone in silent electric discharge ozonizers having discharge surfaces therein comprising providing an oxygen-containing gas containing less than about 5% nitrogen; introducing into the oxygen-containing gas at least one compound selected from the group consisting of sulfur hexafluoride, fluorinated aliphatic acids and fluorinated aliphatic anhydrides in an amount less than about 100 parts per million, said selected compound essentially having a vapor pressure of at least 0.001 mm. of mercury at ambient temperature; passing said oxygen-containing gas and said selected compound through the silent electric discharge of the ozonizer to produce ozone and to activate said discharge surfaces in the presence of said silent electric discharge; and maintaining the dew point of said oxygen-containing gas at less than about $-40°$ C. during passage through said silent electric discharge.

2. A process in accordance with claim 1 wherein said selected compound is intermittently introduced into said oxygen-containing gas to prevent a decrease in the efficiency of ozone production.

3. A process in accordance with claim 1 wherein said oxygen-containing gas and said selected compound pass through a silent electric discharge maintained between two glass surfaces.

4. A process in accordance with claim 1 wherein said oxygen-containing gas and said selected compound pass through a silent electric discharge maintained between two borosilicate glass surfaces.

5. A process in accordance with claim 1 wherein said oxygen-containing gas and said selected compound pass through a silent electric discharge maintained between one aluminum surface and one glass surface.

6. A process in accordance with claim 1 wherein said oxygen-containing gas and said selected compound pass through a silent electric discharge maintained between one borosilicate glass surface and one aluminum surface.

7. A process in accordance with claim 1 wherein the dew point of said oxygen-containing gas is maintained below about $-60°$ C. and said selected compound is introduced into said oxygen-containing gas in an amount less than about 10 parts per million.

8. A process in accordance with claim 1 wherein said compound is trifluoroacetic acid.

9. An improved method for the production of ozone in accordance with claim 1 wherein the oxygen-containing gas contains less than about 2% nitrogen, the dew point of the oxygen-containing gas during the silent electric discharge is maintained at less than about $-60°$ C., and wherein the amount of the selected compound is less than about 10 parts per million.

References Cited by the Examiner

UNITED STATES PATENTS

| | | | |
|---|---|---|---|
| 2,561,014 | 7/51 | Daily | 204—313 |
| 2,850,446 | 9/58 | Cromwell | 204—176 |
| 2,876,077 | 3/59 | Haller | 204—176 |

OTHER REFERENCES

Schumb et al.: Industrial and Engineering Chemistry, vol. 41, No. 7, pages 1348–1350, July 1949.

WINSTON A. DOUGLAS, *Primary Examiner.*

JOSEPH REBOLD, JOHN H. MACK, *Examiners.*